March 20, 1928.
T. J. MELL
1,663,275
METHOD OF PRODUCING GRAINED RUBBER ARTICLES
Filed Nov. 18, 1926
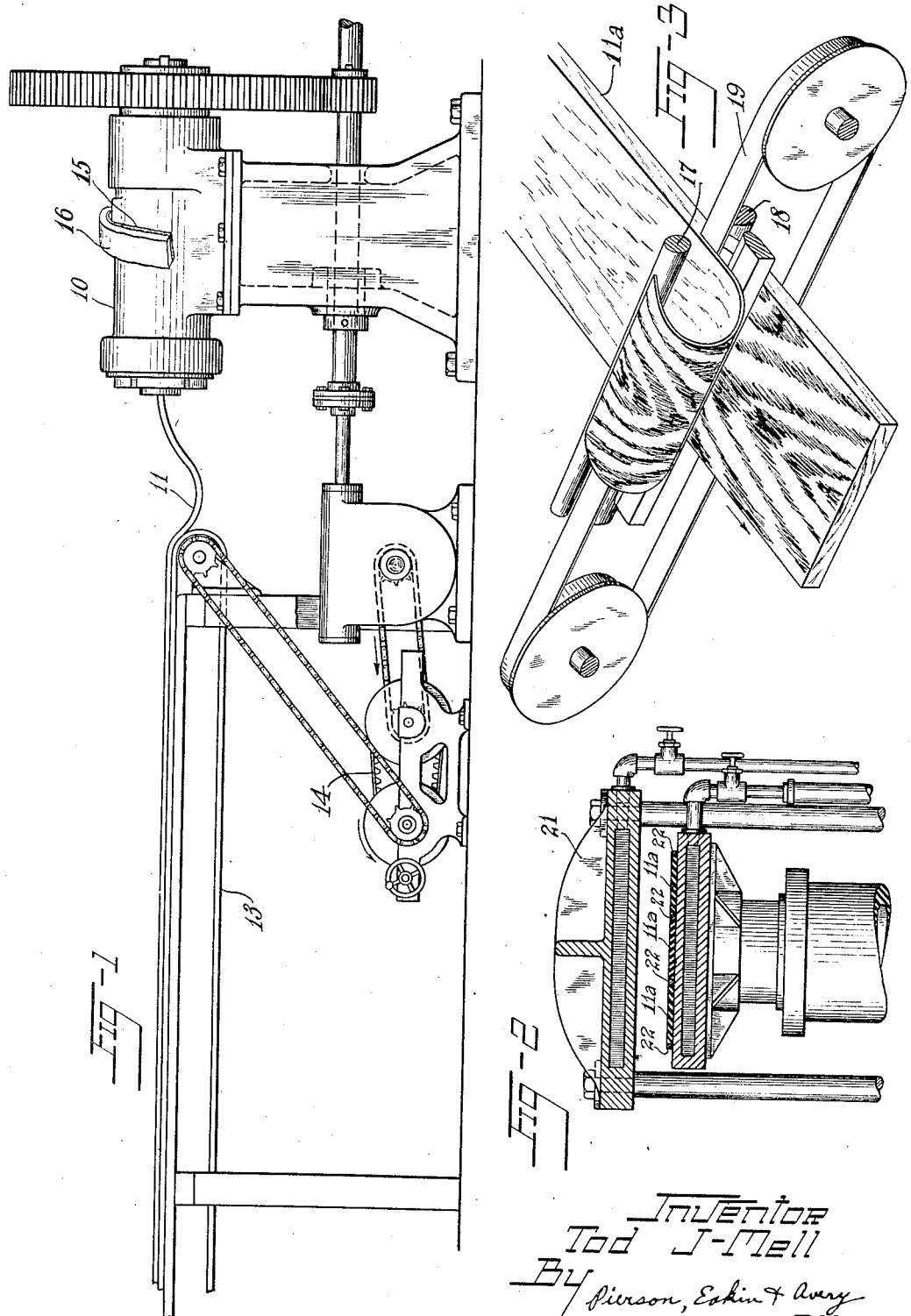

Patented Mar. 20, 1928.

1,663,275

UNITED STATES PATENT OFFICE.

TOD J. MELL, OF AKRON, OHIO, ASSIGNOR TO THE B. F. GOODRICH COMPANY, OF NEW YORK, N. Y., A CORPORATION OF NEW YORK.

METHOD OF PRODUCING GRAINED-RUBBER ARTICLES.

Application filed November 18, 1926. Serial No. 149,149.

This invention relates to the art of producing variegated rubber articles and especially rubber articles having a wood-grain effect in their surface color design. Various expedients have been proposed heretofore for obtaining such effects in rubber or other initially plastic material, but the procedures proposed have been elaborate and expensive and the results inferior as compared with my invention, wherein the actual structural characteristics of wood is closely approximated, so that different graining effects may be obtained from the grained mass of rubber by cutting it in accordance with the plan of sawing which is employed to obtain a like grain effect in wood.

My chief objects are to provide an improved grained article of rubber in close imitation of the natural grain of wood, and to provide an inexpensive method of producing such an article.

In attaining these objects I produce a slab of rubber compounds of different colors in which the compounds have a structural relation closely approximating that of the differently colored portions of wood, and I have discovered that this can be done effectively and inexpensively by passing the differently colored rubber compounds simultaneously through an ordinary extruding machine, the compounds preferably being fed into the machine in such manner and in slabs of such form as to avoid an excessive intermixing of them by the screw of the extruding machine, and in such association as to be worked into the desired grained structure by the screw.

Of the accompanying drawings:

Fig. 1 is a side elevation of apparatus, including an extruding machine, for forming and handling the slab of rubber.

Fig. 2 is a cross-section of a vulcanizing press having a plurality of the slabs mounted therein for vulcanization.

Fig. 3 is a perspective view of apparatus for cutting the slab into sheets, and of the work in association therewith.

Referring to the drawings, the extruding machine, 10, is preferably provided with a die adapted to form a rubber strip 11 of rectangular cross-sectional form, and means, such as the endless-belt conveyor 13, having driving connection with the extruding machine 10 through a variable speed device 14, is provided for receiving the continuous slab strip as it is formed.

The stocks of different colors are preferably formed into respective strips 15, 16 of elongated form and one of the strips superimposed upon the other in registry, face to face, as shown in Fig. 1, and fed into the extruding machine in this relation, as shown, so that they will to a considerable extent maintain a layer-on-layer relation throughout their passage through the machine. My invention is not wholly limited to this relation of the stocks as they pass into the machine, however, as the manner of feeding them into the machine may be varied in accordance with the type of graining desired.

The continuous slab strip 11 preferably is cut into lengths 11ª, 11ª upon the conveyor 13 and each of these lengths is sliced into a plurality of sheets by apparatus such as that shown in Fig. 3, in accordance with my United States Patent No. 1,588,797, of June 15, 1926, the apparatus comprising a pair of driven feed rolls 17, 18 adapted to compress and drive forward the slab and an endless belt-knife 19 adapted to slice the slab as it emerges from the nip of the rolls, the rolls preferably being so closely set as to create in the slab a zone of substantial tension, in the direction of its thickness, along the compression zone, and the knife being so positioned as to cut in such region of tension.

The slab is preferably vulcanized before the slicing operation, as by mounting a plurality of the slabs in a vulcanizing press such as that shown at 21, with metal retaining strips 22 mounted between the slabs and at the outer edges of the outermost slabs.

The slicing of the slab exposes its internal structure as a surface design, and this design, by reason of the somewhat but not entirely uniform action of the extruding machine screw upon the stocks, very closely approximates the appearance of wood grain, especially when the differently colored slabs are fed into the machine in superposed, elongated strips as described. The vulcanization of the slabs before the slicing operation avoids distortion and smearing of the design in the slicing of the slab.

Modifications are possible within the scope of my invention as defined in the appended claims.

I claim:

1. The method of producing a grained rubber article which comprises passing two rubber compounds of different colors through an extruding machine together to produce an internally grained strip and removing rubber from the strip to expose the internal grain thereof.

2. A method as defined in claim 1 in which the compounds are fed into the extruding machine in the form of elongated strips with a strip of one color extending alongside of a strip of another color.

In witness whereof I have hereunto set my hand this 11th day of November, 1926.

TOD J. MELL.